United States Patent Office 3,457,304
Patented July 22, 1969

3,457,304
ANTI-CAKING AGENT FOR SODIUM
TRICHLOROACETATE
Forrest C. Amstutz, Midland, Mich., assignor to The Dow Chemical Company, Midland, Mich., a corporation of Delaware
No Drawing. Filed Apr. 18, 1966, Ser. No. 543,033
Int. Cl. C07c 53/16
U.S. Cl. 260—539  3 Claims

ABSTRACT OF THE DISCLOSURE

The present disclosure is directed to a non-caking, solid, free-flowing sodium trichloroacetate composition containing a reaction product of di-sec-butyl phenol, propylene oxide and ethylene oxide as the anti-caking component.

---

This invention is concerned with an anti-caking agent to prevent the caking of sodium trichloroacetate in storage.

The phenomenon of caking is well known in the art although the mechanism thereof is not completely understood. It is generally agreed upon that the term "caking" refers to the bonding together of the particles of a particulate solid; hence, familiar examples of caking are the setting up of fertilizer when exposed to moisture or the similar phenomenon exhibited by brown sugar when exposed to varying atmospheric conditions over a period of time. Caking of many particulate substances occurs under the weight of the substance, without more; but the process is usually accelerated when the particulate substance is placed under weight, such as that of a pile of sacks of similar material. In this latter situation, common in storage of materials, the caking process is described as taking place "under compaction."

Sodium trichloroacetate, a compound commercially available and extensively employed as a herbicide, is susceptible to caking. In commercial practice, the compound is often sold as pellets. Generally, caking of this compound from either powder or pellet form occurs only shortly after its preparation, and when the substance is placed under compaction, it sets up very hard in a period of time as short as one day. The caked material can be broken up into small lumps by pounding or throwing bagged material, but it cannot be restored to the original free-flowing condition without grinding.

It has now been discovered that caking of sodium trichloroacetate can be essentially prevented by the incorporation therein of an anti-caking amount of a reaction product of di-sec-butylphenol with propylene oxide and ethylene oxide in which the ratio of reactants is, on the average, 1 mole of di-sec-butylphenol, 4 moles of propylene glycol, and 5 moles of ethtylene glycol. Hence the structural formula of this reaction product is essentially as follows

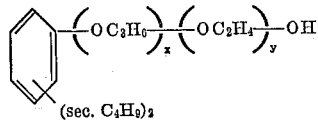

wherein $x$ represents an average of 4 and $y$ represents an average of 5. The substance is a viscous liquid. A representative sample of the substance has a specific gravity of 1.016 at 25° C., and a refractive index $n_D^{25}$ of 1.4773. The substance is soluble in water and the lower alkanols.

The incorporation of this substance, hereinbelow identified as "anti-caking agent" in sodium trichloroacetate in an anti-caking amount results in a substance which remains free-flowing, or capable of being readily restored to a free-flowing condition. Under compaction and atmospheric conditions similarly severe, slight caking has been observed after several months; however, mechanical jolting incidental to normal handling of such material serves to restore the material to a free-flowing condition. Such restoration is also obtained by merely dropping bagged material. As previously noted, untreated sodium trichloroacetate, when once having undergone caking can be restored to easy flowability only by the relatively complicated procedure of grinding.

In carrying out the invention, the anti-caking agent is incorporated into the sodium trichloroacetate in any convenient and suitable fashion. For example, the anti-caking agent can be intimately admixed by mechanical means, such as by spraying the anti-caking agent onto the sodium trichloroacetate and thereafter grinding or comminuting the mixture to obtain an even distribution. Alternately, an aqueous or a loweralkanol solution of the anti-caking agent is sprayed onto the sodium trichloroacetate and the resulting product dried. However, because intimate admixture of a liquid, particularly a viscous liquid, with a solid is difficult to obtain, these methods are seldom preferred.

In another method, the anti-caking agent and sodium trichloroacetate are mixed together in water or a suitable organic liquid, such as a loweralkanol, and the resulting mixture dried. Thus, for example, an aqueous solution of the anti-caking agent can be mixed with an aqueous solution of sodium trichloroacetate and the resulting mixture dried and comminuted, pulverized, or pelleted, to produce the desired composition. However, the admixture of the anti-caking agent and sodium trichloroacetate is most conveniently achieved by adding unmodified anti-caking agent to an aqueous solution of sodium trichloroacetate, inasmuch as such a solution represents a normal step in the process by which the sodium trichloroacetate is synthesized. The addition is preferably carried out with thorough mixing to assure an even dispersion of the anti-caking agent in the sodium trichloroacetate.

The amount of anti-caking agent which serves to effect anti-caking varies. When treating typical industrial grade sodium trichloroacetate, the amount varies within a relatively small range. Generally, the range is from amounts which represent only a trace, such as 0.2 percent, to approximately 2.0 percent, both percentages expressed as the weight of the anti-caking agent by weight of the total resulting dried composition.

When the amount of the anti-caking agent is increased beyond a concentration of about 1.5 percent, the anti-caking effects slowly diminish, and above a concentration of about 2.0 percent, only slight anti-caking effects are observed. Moreover, the use of such higher amounts is less economical. Similarly, when the amount of the anti-caking agent is decreased below a concentration of about 0.5 percent, results are generally less advantageous. Thus, a preferred range is that of from 0.5 to 1.5 percent; and the very best results have been obtained in the range of from 0.75 to 1.0 percent.

The practice of the present invention can also be carried out with sodium trichloroacetate to which has been added one or more other substances, such as various fungicides, insecticides, or other herbicides; surface-active agents; and agents to control the corrosive action of aqueous solutions of sodium trichloroacetate in metal spraying apparatus.

The following examples illustrate the best mode now known for the practice of the present invention and will enable those skilled in the art to carry out the same.

EXAMPLES 1-3

In a standard production run for the preparation of sodium trichloroacetate, there was added to a 65 percent aqueous solution thereof a quantity of unmodified material described as being the reaction product of one molecular proportion di-sec-butylphenol, 4 molecular proportions of propylene oxide, and 5 molecular proportions of ethylene oxide. The resulting mixture was agitated to assure thorough mixing and the agitated mixture fed onto a drum dryer. The product was removed from the drier as a free-flowing dry powder and immediately thereafter fed into a pellet mill which was operated to produce pellets of an individual size of approximately ⅛ inch diameter and ⅜ inch length.

Three separate operations were carried out in accordance with the above procedures. In the first, Example 1, the specified reaction product was added in an amount sufficient to provide 0.5 percent in the dried product; in the second, Example 2, 1.0 percent; and in the third, Example 3, 1.5 percent.

Portions of the three products thus obtained were bagged in 50-pound, multi-wall, polyethylene film lined bags. The bags were stacked vertically, those at the bottom being under a pressure of about 1200 pounds per square foot, and stored for a period of approximately ten days. At the end of this period, the materials were examined. It was found that all portions of the two products wherein the specified reaction product was present in the amounts of 1.0 percent and 1.5 percent, respectively, were free-flowing. It was judged that their condition was essentially indistinguishable from the free-flowing character of the same products immediately after preparation. In the instance of the product containing 0.5 percent of the specified reaction product, it was observed that in certain of the bags, but not necessarily those under compaction, the product was slightly lumpy. The lumpiness disappeared as the bags were handled, and the product then judged to be indistinguishable from its character immediately after preparation.

EXAMPLE 4

An unmodified 65 percent aqueous solution of sodium trichloroacetate was dried and pelleted in accordance with the procedures of Examples 1-3.

Thereafter, the dried and pelleted product was held with the bags of Examples 1-3 and under the same conditions and for the same period of time as the samples evaluated in Examples 1-3. At the end of the ten-day period, the product was examined. In those portions of product under little or essentially no compaction, the product was in the form of large lumps; pounding the lumps had the effect of diminishing slightly the size of the lumps, but the product could not be returned to its original free-flowing character by this means. The portions of the product which were subject to moderate to severe pressure in storage had set up very hard. Pounding of these portions broke them up into large lumps; but it was judged to be impossible to return the product to its original free-flowing character by any simple means.

EXAMPLES 5-9

In further evaluations, varying amounts of material described as being the reaction product of one molecular proportion of di-sec-butylphenol, 4 molecular proportions of propylene oxide, and 5 molecular proportions of ethylene oxide were mixed with sodium trichloroacetate to obtain three products containing the material in varying amounts. In addition, another portion of sodium trichloroacetate was left untreated to serve as a check. The evaluations were carried out in accordance with the procedures of the foregoing examples except that the products were held under compaction for a period of eight months. The amounts of the specified material in the final products and the results obtained at the end of the eight-month period are summarized in the following table:

| | Percent anti-caking agent | Observations on product after 8 months storage under compaction |
|---|---|---|
| Example 5 | None | Very hard, broken up into lumps by repeated pounding with sledge; no further improvement obtained. |
| Example 6 | 0.5 | Scattered lumping observed; lumps disappeared with the mechanical jarring incidental to normal handling of the individual bags; resulting condition judged to be indistinguishable from same product immediately after preparation. |
| Example 7 | 1.0 | No caking and free-flowing; judged to be indistinguishable from same product immediately after preparation. |
| Example 8 | 1.5 | Same condition as Example 7. |
| Example 9 | 2.0 | Same condition as Example 6. |

The anti-caking agent to be employed in accordance with the present invention is prepared in known methods wherein one molecular proportion of di-sec-butylphenol, 4 molecular proportions of propylene oxide, and 5 molecular proportions of ethylene oxide are reacted together. Good results are obtained when operating at temperatures of 125°–160° C. and at pressures of 27–75 pounds per square inch. The reaction is preferably carried out in the presence of sodium or potassium hydroxide in a catalytic amount of about 0.2–0.5 percent based on weight of the product. In carrying out the reaction, the di-sec-butylphenol is mixed with the catalyst and thereafter the propylene and ethylene oxides added, preferably sequentially in that order; separation and purification are carried out in accordance with conventional procedures.

I claim:

1. The solid, free-flowing composition consisting essentially of sodium trichloroacetate and, dispersed therein, an anti-caking amount of an anti-caking compound which is essentially of the formula

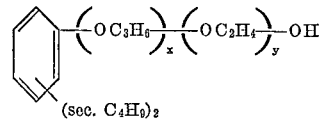

wherein $x$ represents an average of 4 and $y$ represents an average of 5.

2. The composition of claim 1 wherein the said anti-caking compound is present in the amount of from 0.2 to 2.0 percent by weight of ultimate composition.

3. The composition of claim 2 wherein the said anti-caking compound is present in the amount of from 0.5 to 1.5 percent by weight of ultimate composition.

References Cited

UNITED STATES PATENTS

| 3,127,444 | 3/1964 | Tousignant et al. | 260—539 |
| 2,740,813 | 4/1956 | Thornberg et al. | 260—539 |
| 2,915,559 | 12/1959 | Horsley et al. | 260—613 |

FOREIGN PATENTS

| 1,166,761 | 4/1964 | Germany. |

LORRAINE A. WEINBERGER, Primary Examiner

ALBERT P. HALLUIN, Assistant Examiner

U.S. Cl. X.R.

252—384